US012683988B2

(12) United States Patent
El-Azzami et al.

(10) Patent No.: US 12,683,988 B2
(45) Date of Patent: Jul. 14, 2026

(54) MANAGING INTRUSION EVENTS USING A MANAGEMENT CONTROLLER

(71) Applicant: Dell Products L.P., Round Rock, TX (US)

(72) Inventors: Bassem El-Azzami, Austin, TX (US); Richard M. Tonry, Georgetown, TX (US); Adolfo Sandor Montero, Pflugerville, TX (US); Christian L. Critz, Liberty Hill, TX (US); Mohit Arora, Frisco, TX (US); Abeye Teshome, Austin, TX (US); Rajaravi Chandra Kollarapu, Allen, TX (US); Vinodkumar Vasudev Ottar, Mckinney, TX (US); Luis Antonio Valencia Reyes, Waxahachie, TX (US)

(73) Assignee: Dell Products L.P., Round Rock, TX (US)

( * ) Notice: Subject to any disclaimer, the term of this patent is extended or adjusted under 35 U.S.C. 154(b) by 9 days.

(21) Appl. No.: 18/649,248

(22) Filed: Apr. 29, 2024

(65) Prior Publication Data

US 2025/0337753 A1      Oct. 30, 2025

(51) Int. Cl.
*H04L 9/40*          (2022.01)

(52) U.S. Cl.
CPC ............................... *H04L 63/1416* (2013.01)

(58) Field of Classification Search
CPC .................................................. H04L 63/1416
See application file for complete search history.

(56) References Cited

U.S. PATENT DOCUMENTS

| | | | |
|---|---|---|---|
| 7,969,909 | B2 | 6/2011 | Oerton |
| 8,042,182 | B2 | 10/2011 | Milani Comparetti et al. |
| 8,477,647 | B2 | 7/2013 | Tamura |
| 8,533,345 | B2 | 9/2013 | Fedotenko |
| 8,538,023 | B2 | 9/2013 | Yao |
| 8,615,785 | B2 | 12/2013 | Elrod et al. |

(Continued)

FOREIGN PATENT DOCUMENTS

| | | |
|---|---|---|
| CN | 105530121 A | 4/2016 |
| CN | 109756797 A | 5/2019 |

(Continued)

OTHER PUBLICATIONS

Latvala et al., "Evaluation of Out-of-Brand Channels for IoT Security", SN Computer Science, pp. 1-17 (Year: 2020).

*Primary Examiner* — Thomas J Dailey
(74) *Attorney, Agent, or Firm* — WOMBLE BOND DICKINSON (US) LLP

(57)          ABSTRACT

Methods and systems for managing intrusion events for endpoint devices are disclosed. To manage intrusion events, an endpoint device may include a management controller. In response to an intrusion event, the management controller may perform a forensic analysis to identify an impact of the intrusion event. The management controller may snoop communications between hardware components of the endpoint device to identify any hardware components compromised by the intrusion event. A forensic report may be obtained based on the snooped communications and an action set may be performed to remediate the impact of the intrusion event. The forensic report may also be provided to a remote server via an out of band communication channel.

20 Claims, 6 Drawing Sheets

(56) References Cited

U.S. PATENT DOCUMENTS

| | | | |
|---|---|---|---|
| 8,924,620 | B2 | 12/2014 | Harriman et al. |
| 9,215,244 | B2 | 12/2015 | Ayyagari et al. |
| 9,319,967 | B2 | 4/2016 | Jonker |
| 9,413,783 | B1 | 8/2016 | Keogh |
| 9,734,169 | B2 | 8/2017 | Redlich et al. |
| 9,980,213 | B2 | 5/2018 | Lynch |
| 10,079,842 | B1* | 9/2018 | Brandwine ......... H04L 63/1441 |
| 10,176,308 | B2 | 1/2019 | Mintz et al. |
| 10,298,670 | B2 | 5/2019 | Ben-Shael et al. |
| 10,341,939 | B2 | 7/2019 | Peng |
| 10,362,608 | B2 | 7/2019 | Gorajala Chandra |
| 10,671,765 | B2 | 6/2020 | Swierk et al. |
| 10,972,508 | B1* | 4/2021 | Dods ................... H04L 63/1433 |
| 11,036,902 | B2 | 6/2021 | Nicholas |
| 11,102,122 | B2 | 8/2021 | Seed et al. |
| 11,134,380 | B2 | 9/2021 | Fox et al. |
| 11,258,819 | B1 | 2/2022 | Agarwal |
| 11,399,283 | B2 | 7/2022 | Anantha |
| 11,487,274 | B2 | 11/2022 | Valder et al. |
| 11,792,267 | B2 | 10/2023 | Kreiner et al. |
| 11,831,654 | B2 | 11/2023 | Hinchliffe |
| 11,876,691 | B2 | 1/2024 | Chang |
| 12,034,765 | B1 | 7/2024 | Barkan |
| 12,302,236 | B2 | 5/2025 | Grayson |
| 2002/0199120 | A1 | 12/2002 | Schmidt |
| 2008/0072291 | A1* | 3/2008 | Carley ..................... H04L 63/20 |
| | | | 726/3 |
| 2009/0197571 | A1 | 8/2009 | Kitajima |
| 2010/0083381 | A1 | 4/2010 | Khosravi |
| 2010/0169949 | A1 | 7/2010 | Rothman |
| 2011/0087387 | A1 | 4/2011 | Safa-Bakhsh et al. |
| 2011/0119765 | A1 | 5/2011 | Hering |
| 2013/0152161 | A1 | 6/2013 | Onno |
| 2014/0157405 | A1* | 6/2014 | Joll ...................... H04L 63/1425 |
| | | | 726/22 |
| 2014/0366105 | A1 | 12/2014 | Bradley |
| 2016/0098561 | A1* | 4/2016 | Keller ................... G06F 21/566 |
| | | | 726/24 |
| 2016/0345171 | A1 | 11/2016 | Kulkarni |
| 2016/0378103 | A1* | 12/2016 | Malinowski ............ H04W 4/90 |
| | | | 701/29.2 |
| 2017/0063932 | A1 | 3/2017 | Hubbard |
| 2017/0094377 | A1 | 3/2017 | Herdrich |
| 2017/0244753 | A1 | 8/2017 | Hu |
| 2017/0353367 | A1 | 12/2017 | Slaight |
| 2018/0039946 | A1 | 2/2018 | Bolte et al. |
| 2018/0082066 | A1 | 3/2018 | Munjal |
| 2018/0145915 | A1* | 5/2018 | Caputo, II .............. H04L 45/30 |
| 2018/0176215 | A1 | 6/2018 | Perotti |
| 2019/0294782 | A1 | 9/2019 | Cudak |
| 2020/0092251 | A1 | 3/2020 | Peterson |
| 2020/0366754 | A1 | 11/2020 | Wang |
| 2021/0034048 | A1 | 2/2021 | Hajizadeh |
| 2021/0073211 | A1 | 3/2021 | Wright, Sr. |
| 2021/0211450 | A1 | 7/2021 | Aleidan |
| 2021/0258808 | A1 | 8/2021 | Mahimkar |
| 2021/0382635 | A1 | 12/2021 | Ma |
| 2022/0038659 | A1 | 2/2022 | Michel |
| 2022/0300960 | A1 | 9/2022 | Gutzeit |
| 2022/0353589 | A1 | 11/2022 | Chawla |
| 2023/0027152 | A1 | 1/2023 | Doshi |
| 2023/0110141 | A1 | 4/2023 | Ramasamy |
| 2023/0246931 | A1 | 8/2023 | Chang |
| 2023/0412619 | A1 | 12/2023 | Tshouva |
| 2024/0069808 | A1 | 2/2024 | Bukhari |
| 2024/0195837 | A1* | 6/2024 | Duplys ............... H04L 63/1416 |
| 2024/0430259 | A1 | 12/2024 | Meller |
| 2025/0047712 | A1 | 2/2025 | Sawal |
| 2025/0138839 | A1 | 5/2025 | Teshome |
| 2025/0138945 | A1 | 5/2025 | Teshome |
| 2025/0139298 | A1 | 5/2025 | Ottar |
| 2025/0141814 | A1 | 5/2025 | Montero |
| 2025/0141880 | A1 | 5/2025 | Teshome |
| 2025/0142444 | A1 | 5/2025 | Arora |
| 2025/0245059 | A1 | 7/2025 | Kollarapu |
| 2025/0245353 | A1 | 7/2025 | Montero |
| 2025/0247670 | A1 | 7/2025 | Montero |
| 2025/0247703 | A1 | 7/2025 | El-Azzami |

FOREIGN PATENT DOCUMENTS

| | | |
|---|---|---|
| CN | 113221197 A | 8/2021 |
| CN | 117439758 A | 1/2024 |
| EP | 4535743 A1 | 4/2025 |

* cited by examiner

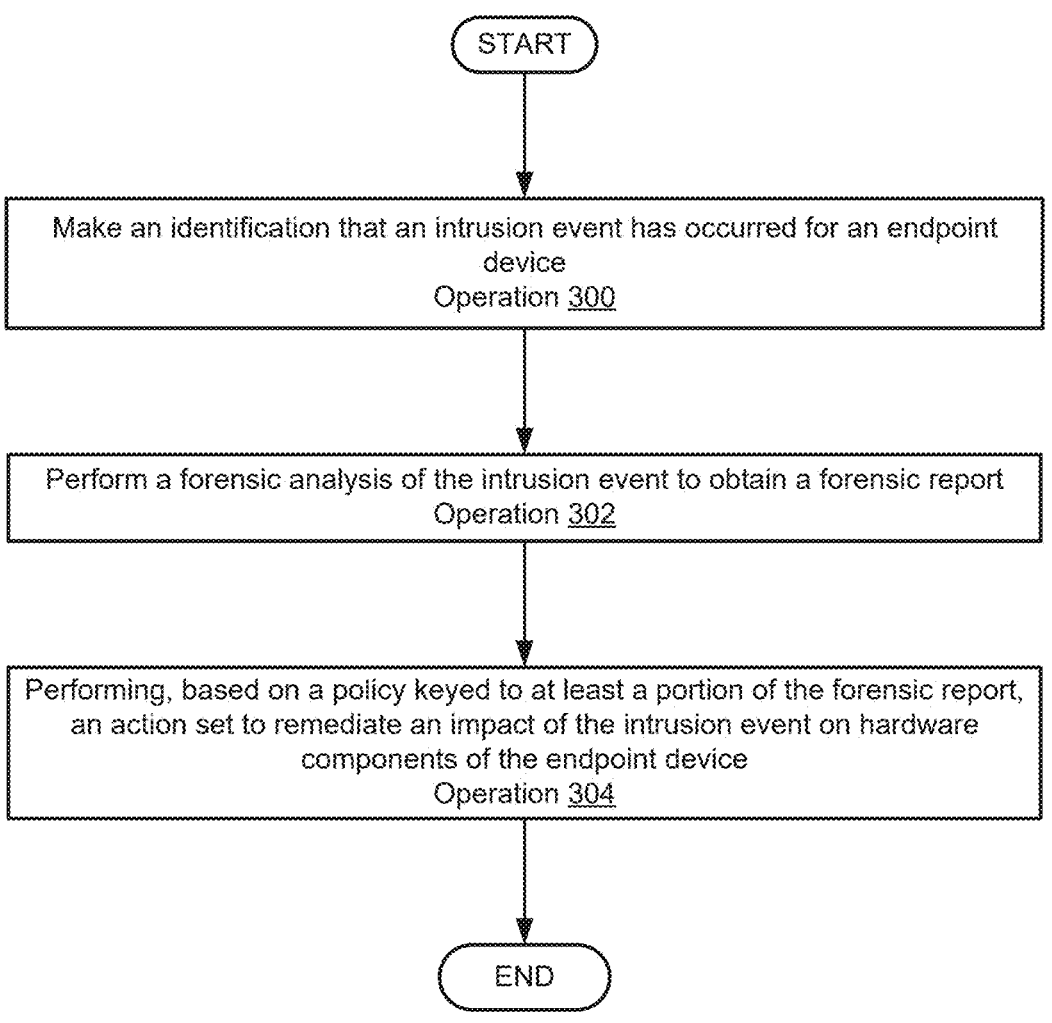

START

Make an identification that an intrusion event has occurred for an endpoint
device
Operation 300

Perform a forensic analysis of the intrusion event to obtain a forensic report
Operation 302

Performing, based on a policy keyed to at least a portion of the forensic report,
an action set to remediate an impact of the intrusion event on hardware
components of the endpoint device
Operation 304

END

FIG. 3

MANAGING INTRUSION EVENTS USING A MANAGEMENT CONTROLLER

FIELD

Embodiments disclosed herein relate generally to managing intrusion events for endpoint devices. More particularly, embodiments disclosed herein relate to systems and methods to manage intrusion events using a management controller of an endpoint device.

BACKGROUND

Computing devices may provide computer-implemented services. The computer-implemented services may be used by users of the computing devices and/or devices operably connected to the computing devices. The computer-implemented services may be performed with hardware components such as processors, memory modules, storage devices, and communication devices. The operation of these components and the components of other devices may impact the performance of the computer-implemented services.

BRIEF DESCRIPTION OF THE DRAWINGS

Embodiments disclosed herein are illustrated by way of example and not limitation in the figures of the accompanying drawings in which like references indicate similar elements.

FIG. 3 shows a flow diagram illustrating a method of managing an intrusion event using a management controller in accordance with an embodiment.

DETAILED DESCRIPTION

Figure 1A:
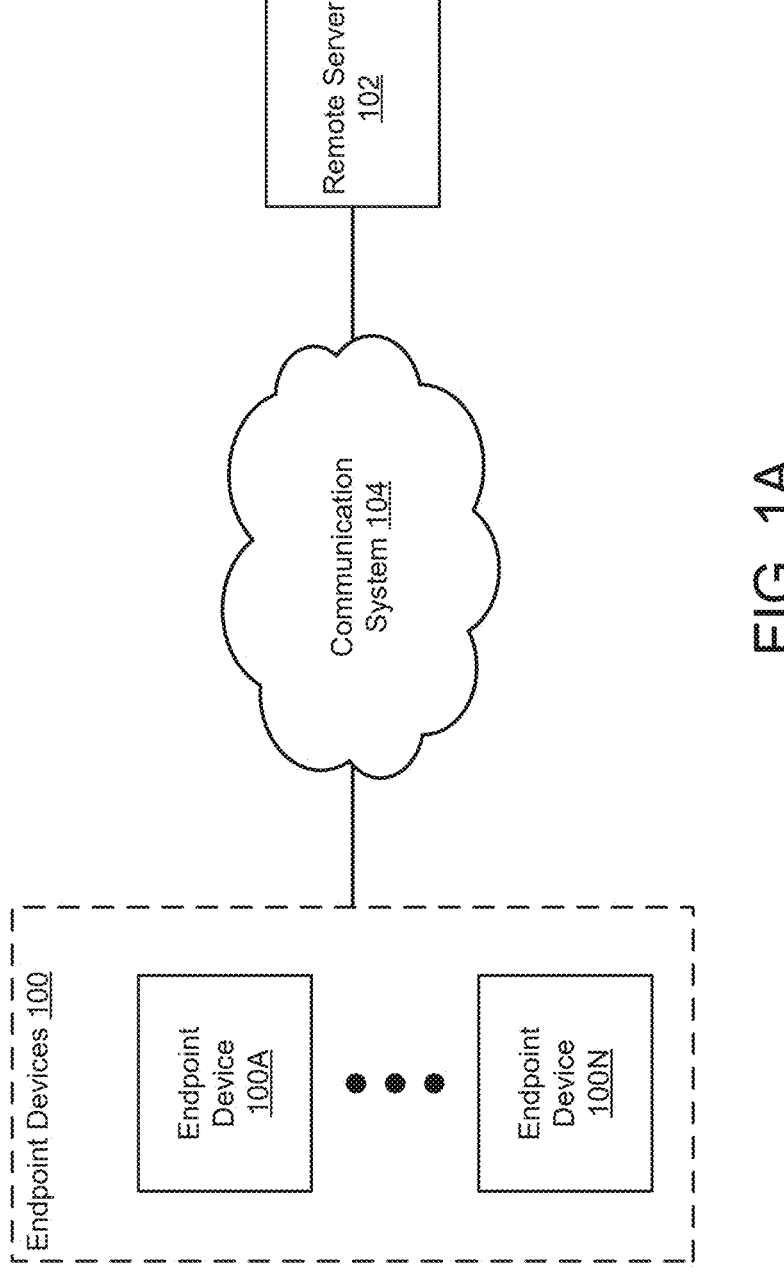
FIG. 1A shows a block diagram illustrating a system in accordance with an embodiment.

Various embodiments will be described with reference to details discussed below, and the accompanying drawings will illustrate the various embodiments. The following description and drawings are illustrative and are not to be construed as limiting. Numerous specific details are described to provide a thorough understanding of various embodiments. However, in certain instances, well-known or conventional details are not described in order to provide a concise discussion of embodiments disclosed herein.

Reference in the specification to "one embodiment" or "an embodiment" means that a particular feature, structure, or characteristic described in conjunction with the embodiment can be included in at least one embodiment. The appearances of the phrases "in one embodiment" and "an embodiment" in various places in the specification do not necessarily all refer to the same embodiment.

References to an "operable connection" or "operably connected" means that a particular device is able to communicate with one or more other devices. The devices themselves may be directly connected to one another or may be indirectly connected to one another through any number of intermediary devices, such as in a network topology.

In general, embodiments disclosed herein relate to methods and systems for managing endpoint devices. The endpoint devices may provide computer-implemented services. The computer-implemented services may include any quantity and type of such services.

While providing the computer-implemented services, an unauthorized entity (e.g., a malicious entity) may attempt to compromise the endpoint devices (e.g., by physical intrusion, by injection of malware). Compromise of the endpoint devices may lead to non-nominal operation of hardware and/or software components of the endpoint devices, unauthorized modifications to configurations and/or other functionalities of the endpoint devices, etc. Consequently, the computer-implemented services may not be provided as desired, may be interrupted, and/or may become unavailable.

To manage an impact of the intrusion events on the computer-implemented services, an endpoint device may include a management controller. The management controller may be an out of band component of the endpoint device and, therefore, may utilize a communication channel that does not traverse potentially compromised hardware resources of the endpoint device. In addition, the management controller may be positioned on a separate power domain from the hardware resources and, therefore, may be operational when the hardware resources are unpowered.

The management controller may perform a forensic analysis following the intrusion event by snooping communications between hardware components of the hardware resources. By doing so, the management controller may identify hardware components impacted by the intrusion event and may identify modifications made to the hardware components during the intrusion event.

A forensic report may be generated as a result of the forensic analysis, the forensic report indicating hardware components impacted by the intrusion event and any identified modifications made to the impacted hardware components during the intrusion event. Using the forensic report, the management controller may perform an action set to remediate the impact of the intrusion event on the impacted hardware components. The management controller may also provide the forensic report to a remote entity (e.g., a remote server).

By doing so, embodiments disclosed herein may provide a system for managing intrusion events for an endpoint device using out of band methods. A management controller of the endpoint device may respond to intrusion alerts regardless of a state (e.g., a power state, a connectivity state, an operational state) of hardware resources of the endpoint device and without intervention by a user of the endpoint device. Thus, the endpoint device may be more likely to provide computer-implemented services as desired to downstream consumers of the computer-implemented services.

In an embodiment, a method of managing security for an endpoint device is provided. The method may include: making, by a management controller of the endpoint device, an identification that an intrusion event has occurred for the endpoint device; performing, by the management controller, a forensic analysis of the intrusion event to obtain a forensic report, the forensic report indicating an impact of the intrusion event on hardware components of the endpoint device, and the forensic analysis being performed, at least in part, by snooping communication between the hardware components of the endpoint device; and performing, by the management controller and based on a policy keyed at least a portion of the forensic report, an action set to remediate the impact of the intrusion event on the hardware components of the endpoint device.

Making the identification that an intrusion event has occurred may include obtaining, by the management controller, an intrusion alert from a tamper detection device of the endpoint device.

The tamper detection device may include at least one device selected from a list of devices consisting of: an intrusion detector; a general-purpose input/output (GPIO) tamper detector; and a serial communication tamper detector.

The forensic report may include: an identifier for a first hardware component of the hardware components impacted by the intrusion event; and a list of identified modifications made to the first hardware component during the intrusion event, the list being based at least in part on the snooped communications.

Performing the action set may include at least one action selected from a list of actions consisting of: disabling the first hardware component; depowering the first hardware component; and reversing the identified modifications.

The method may also include: providing, by the management controller and via an out of band communication channel, the forensic report to a remote server.

Performing the action set may include: providing, by the management controller, the forensic report to a startup management entity of the endpoint device to cause the startup management entity to revert impact of the intrusion event on the hardware components.

The endpoint device may include a network module adapted to separately advertise network endpoints for the management controller and hardware resources of the endpoint device, the network endpoints being usable by the remote server to address communications to the hardware resources and the management controller.

The management controller and the network module may be on separate power domains from the hardware resources so that the management controller and the network module are operable while the hardware resources are inoperable.

The out of band communication channel may run through the network module, and an in band communication channel that services the hardware resources may also run through the network module.

The network module may host a transmission control protocol/internet protocol (TCP/IP) stack to facilitate network communications via the out of band communication channel.

In an embodiment, a non-transitory media is provided. The non-transitory media may include instructions that when executed by a processor cause the computer-implemented method to be performed.

In an embodiment, a data processing system is provided. The data processing system may include the non-transitory media and a processor, and may perform the method when the computer instructions are executed by the processor.

Figure 1B:
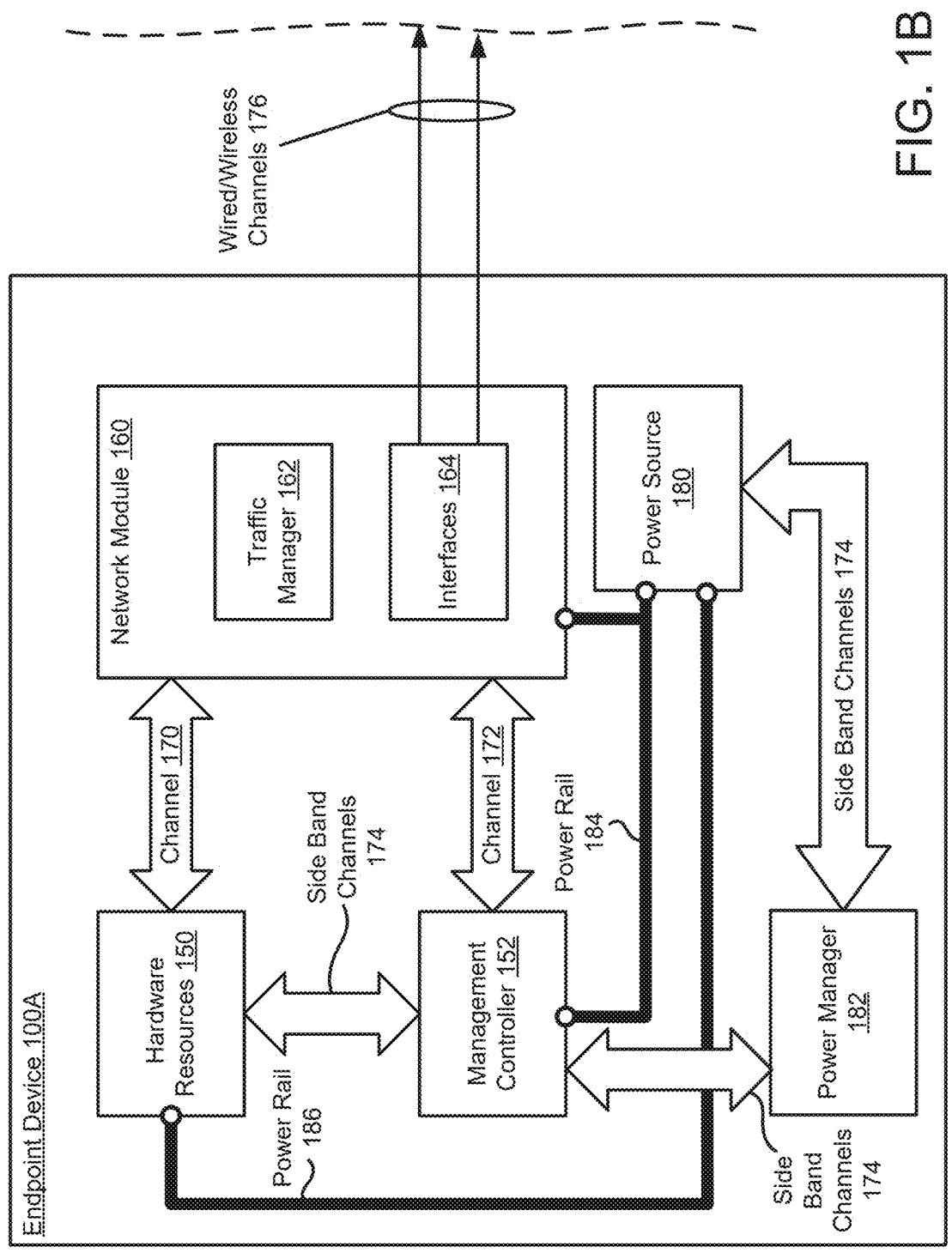
FIG. 1B shows a block diagram illustrating an endpoint device in accordance with an embodiment.

Turning to FIG. 1A, a block diagram illustrating a distributed environment (e.g., system) in accordance with an embodiment is shown. The system shown in FIG. 1A may provide for management of endpoint devices that may provide, at least in part, computer-implemented services. The system may include any number of endpoint devices 100 (e.g., computing devices) that may each include hardware components (e.g., processors, memory modules, storage devices, communications devices). The hardware components may support execution of any number and types of applications (e.g., software components). Refer to FIG. 1B for additional details regarding the endpoint devices.

The computer-implemented services may include any type and quantity of computer-implemented services. The computer-implemented services may include, for example, database services, data processing services, electronic communication services, and/or any other services that may be provided using one or more computing devices. The computer-implemented services may be provided by, for example, endpoint devices 100, remote server 102 and/or any other type of devices (not shown in FIG. 1A). Other types of computer-implemented services may be provided by the system shown in FIG. 1A without departing from embodiments disclosed herein.

To provide the aforementioned computer-implemented services, any of endpoint devices 100 (e.g., 100A, 100N) may need to operate in a predetermined manner. For example, certain hardware components and/or software components of the endpoint devices may need to be operational for endpoint devices 100 to provide a desired type and/or quantity of computer-implemented services.

Unauthorized entities (e.g., malicious entities) may attempt to compromise an endpoint device (e.g., 100A) to manipulate the computer-implemented services. Compromising endpoint device 100A may include an intrusion event such as a physical intrusion to the endpoint device (e.g., opening a chassis of endpoint device 100A), injection of malware (e.g., to modify operation of software and/or hardware components of endpoint device 100A), etc.

Endpoint device 100A may include various tamper detection devices such as an intrusion detector, a general-purpose input/output (GPIO) tamper detector, a serial communication tamper detector, and/or other types of tamper detection devices. The tamper detection devices may identify that an intrusion has occurred. However, the tamper detection devices may not identify components of endpoint device 100A that were impacted by the intrusion event (e.g., components that were modified by the unauthorized entity).

In addition, in band components of endpoint device 100A may be subject to failures (e.g., power failures, connectivity failures, compromise due to malware) and, therefore, may be unable to reliably interrogate an impact of the intrusion event on hardware resources of endpoint device 100A. Consequently, the unauthorized entity may exploit modifications made to the hardware components and/or may manipulate endpoint device 100A so that the computer-implemented services are interrupted, suspended, and/or otherwise negatively impacted.

In general, embodiments disclosed herein relate to systems, devices, and methods for managing endpoint devices using out of band methods so that intrusion events may be managed and impacts of the intrusion events may be remediated regardless of a power or operational state of the endpoint devices. Endpoint devices 100 may include out of band components (e.g., a management controller) that may communicate with remote systems (e.g., remote server 102) without traversing in band communication channels and without utilizing the in band components of endpoint devices 100 (e.g., hardware resources of endpoint devices 100).

To do so, the management controller may perform a forensic analysis following identification that an intrusion event has occurred. Performing the forensic analysis may include snooping communications between hardware components of an endpoint device and/or other processes. As a result, the management controller may obtain a forensic report indicating an impact of the intrusion event on the hardware components. The forensic report may include a list of hardware components modified during the intrusion event and any identified modifications that were made to the hardware components during the intrusion event.

The management controller may perform actions, based on a policy keyed to at least a portion of the forensic report, to remediate the impact of the intrusion event on the hardware components. The action set may include: (i) depowering a hardware component of endpoint device 100A, (ii) disabling a hardware component of endpoint device 100A, (iii) reversing an identified modification to a hardware component of endpoint device 100A, and/or (iv) other actions.

Performing the action set may also include providing, by the management controller, a copy of the forensic report to a startup management entity (a basic input/output system (BIOS)) of endpoint device 100A. Doing so may cause the startup management entity to revert an impact of the intrusion event on the hardware components.

The management controller may also provide a copy of the forensic report and/or other information to a remote server via an out of band communication channel that does not traverse the potentially manipulated hardware components. Refer to FIG. 1B for additional details regarding the out of band communication channel.

To perform the above-mentioned functionality, the system of FIG. 1A may include endpoint devices 100, remote server 102, and/or other components. Endpoint devices 100, remote server 102, and/or any other type of devices not shown in FIG. 1A may perform all, or a portion of the computer-implemented services independently and/or cooperatively. Each of these components is discussed below.

Endpoint devices 100 may include any number and/or type of endpoint devices (e.g., 100A-100N). Any of endpoint devices 100 may include in band components (e.g., hardware resources), out of band components (e.g., a management controller) and functionality that may allow the out of band components to interact with remote systems independently from the in band components. For more information regarding in band and out of band components of endpoint devices 100, refer to the discussion of FIG. 1B.

Remote server 102 may be implemented using physical devices located remote to endpoint devices 100 that monitors operation of endpoint devices 100. Remote server 102 may communicate with endpoint device 100A by directing communications to network endpoints associated with the management controller (e.g., via an out of band communication channel) and/or the hardware resources (e.g., via an in band communication channel).

Remote server 102 may monitor intrusion events for endpoint devices 100. To do so, a management controller of endpoint device 100A, for example, may provide an intrusion alert, a forensic report, and/or other information to remote server 102 via an out of band communication channel. Remote server 102 may store this information, may provide instructions to the management controller regarding a response to the intrusion event, and/or may otherwise monitor performance of endpoint device 100A.

Thus, intrusion events for endpoint device 100A may be managed using out of band methods. A management controller of endpoint device 100A may perform actions to remediate an impact of the intrusion events on endpoint device 100A thereby improving a quality and/or reliability of the computer-implemented services provided by endpoint devices 100.

Figure 2A:
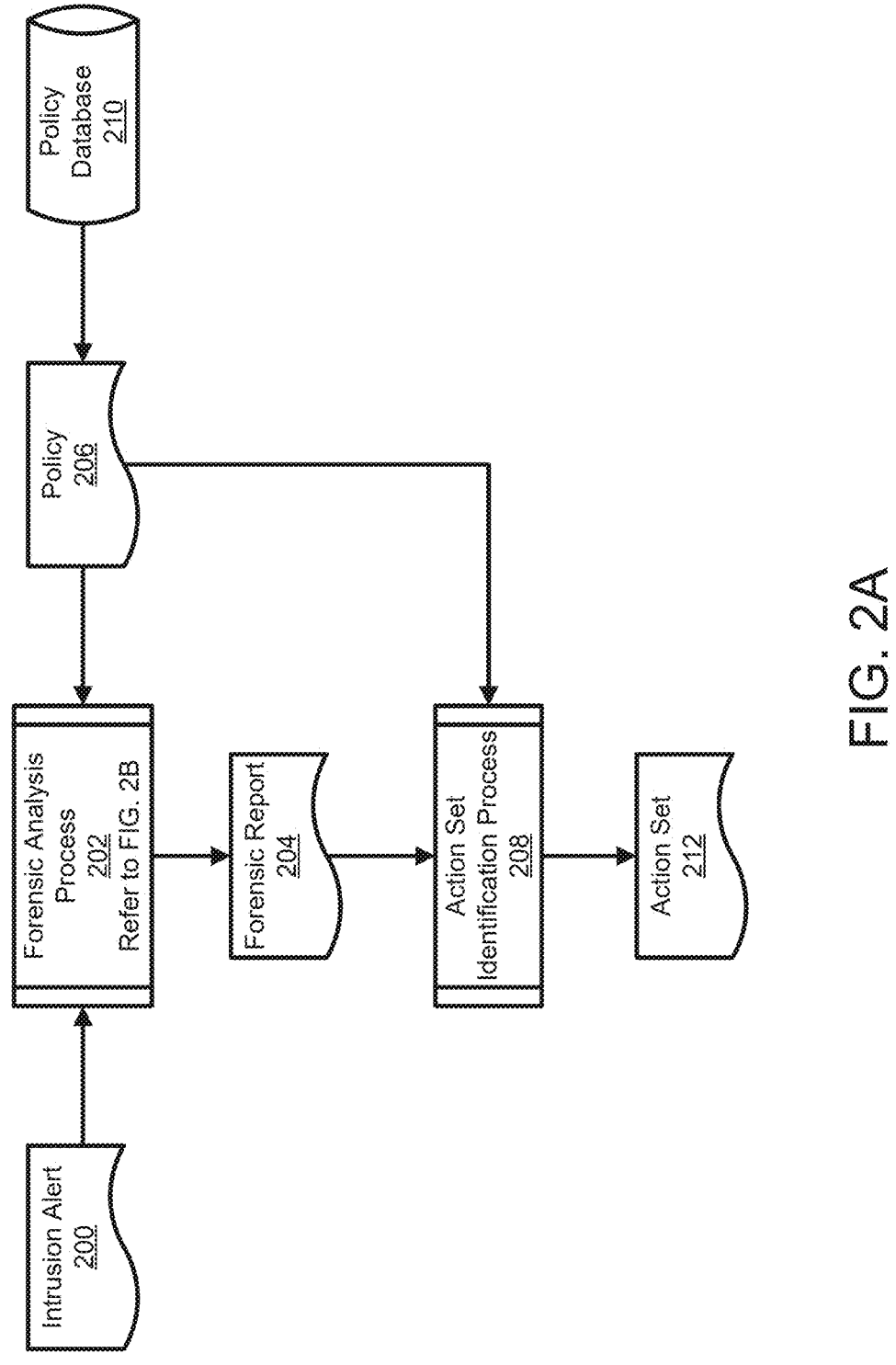
FIG. 2A shows a data flow diagram illustrating management of an intrusion event in accordance with an embodiment.

When providing their functionality, any of endpoint devices 100, remote server 102, and/or other devices may perform all, or a portion of the method shown in FIGS. 2A-3.

Any of (and/or components thereof) endpoint devices 100, and/or remote server 102 may be implemented using a computing device (also referred to as a data processing system) such as a host or a server, a personal computer (e.g., desktops, laptops, and tablets), a "thin" client, a personal digital assistant (PDA), a Web enabled appliance, a mobile phone (e.g., smartphone), an embedded system, local controllers, an edge node, and/or any other type of data processing device or system. For additional details regarding computing devices, refer to the discussion of FIG. 4.

In an embodiment, one or more of endpoint devices 100 and/or remote server 102 are implemented using an internet of things (IoT) device, which may include a computing device. The IoT device may operate in accordance with a communication model and/or management model known to endpoint devices 100, remote server 102, and/or other devices.

Any of the components illustrated in FIG. 1A may be operably connected to each other (and/or components not illustrated) with communication system 104. In an embodiment, communication system 104 includes one or more networks that facilitate communication between any number of components. The networks may include wired networks and/or wireless networks (e.g., and/or the Internet). The networks may operate in accordance with any number and/or types of communication protocols (e.g., such as the internet protocol).

Communication system 104 may be implemented with one or more local communications links (e.g., a bus interconnecting a processor of any of endpoint devices 100 and remote server 102).

Communication system 104 may include out of band communication channels, in band communication channels, and/or other types of communication channels.

Refer to FIG. 1B for additional details regarding the management controller, network module, out of band communication channel, and/or hardware resources of endpoint devices 100.

While illustrated in FIG. 1A as including a limited number of specific components, a system in accordance with an embodiment may include fewer, additional, and/or different components than those illustrated therein.

Turning to FIG. 1B, a diagram illustrating endpoint device 100A in accordance with an embodiment is shown. Endpoint device 100A may be similar to any of endpoint devices 100 described in FIG. 1A.

To provide computer-implemented services, endpoint device 100A may include any quantity of hardware resources 150. Hardware resources 150 may be in band hardware components, and may include a processor operably coupled to memory, storage, and/or other hardware components.

The processor may host various management entities such as operating systems, drivers, network stacks, and/or other software entities that provide various management functionalities. For example, the operating system and drivers may provide abstracted access to various hardware resources. Likewise, the network stack may facilitate packaging, transmission, routing, and/or other functions with respect to exchanging data with other devices.

For example, the network stack may support transmission control protocol/internet protocol communication (TCP/IP) (e.g., the Internet protocol suite) thereby allowing hardware resources 150 to communicate with other devices via packet switched networks and/or other types of communication networks.

The processor may also host various applications that provide the computer-implemented services. The applications may utilize various services provided by the management entities and use (at least indirectly) the network stack to communicate with other entities.

However, use of the network stack and the services provided by the management entities may place the applications at risk of indirect compromise. For example, if any of these entities trusted by the applications are compromised, these entities may subsequently compromise the operation of the applications. For example, if various drivers and/or the communication stack are compromised, communications to/from other devices may be compromised. If the applications trust these communications, then the applications may also be compromised.

For example, to communicate with other entities, an application may generate and send communications to a network stack and/or driver, which may subsequently transmit a packaged form of the communication via channel 170 to a communication component, which may then send the packaged communication (in a yet further packaged form, in some embodiments, with various layers of encapsulation being added depending on the network environment outside of endpoint device 100A) to another device via any number of intermediate networks (e.g., via wired/wireless channels 176 that are part of the networks).

To reduce the downtime of endpoint device 100A and to reduce the likelihood of the applications and/or other in band entities from being indirectly compromised, endpoint device 100A may include management controller 152 and network module 160. Each of these components of endpoint device 100A is discussed below.

Management controller 152 may be implemented, for example, using a system on a chip or other type of independently operating computing device (e.g., independent from the in band components, such as hardware resources 150, of a host endpoint device 100A). Management controller 152 may provide various management functionalities for endpoint device 100A. For example, management controller 152 may monitor various ongoing processes performed by the in band components, may manage power distribution, thermal management, and/or other functions of endpoint device 100A.

To do so, management controller 152 may be operably connected to various components via side band channels 174 (in FIG. 1B, a limited number of side band channels are included for illustrative purposes, it will be appreciated that management controller 152 may communication with other components via any number of side band channels). The side band channels may be implemented using separate physical channels, and/or with a logical channel overlay over existing physical channels (e.g., logical division of in band channels). The side band channels may allow management controller 152 to interface with other components and implement various management functionalities such as, for example, general data retrieval (e.g., to snoop ongoing processes), telemetry data retrieval (e.g., to identify a health condition/other state of another component), function activation (e.g., sending instructions that cause the receiving component to perform various actions such as displaying data, adding data to memory, causing various processes to be performed), and/or other types of management functionalities.

For example, to reduce the likelihood of indirect compromise of an application hosted by hardware resources 150, management controller 152 may enable information from other devices to be provided to the application without traversing the network stack and/or management entities of hardware resources 150. To do so, the other devices may direct communications including the information to management controller 152. Management controller 152 may then, for example, send the information via side band channels 174 to hardware resources 150 (e.g., to store it in a memory location accessible by the application, such as a shared memory location, a mailbox architecture, or other type of memory-based communication system) to provide it to the application. Thus, the application may receive and act on the information without the information passing through potentially compromised entities. Consequently, the information may be less likely to also be compromised, thereby reducing the possibility of the application becoming indirectly compromised. Similar processes may be used to facilitate outbound communications from the applications.

Management controller 152 may also manage intrusion events for endpoint device 100A. To do so, management controller 152 may: (i) identify that an intrusion event has occurred for endpoint device 100A, (ii) perform a forensic analysis of the intrusion event to obtain a forensic report, (iii) perform an action set to remediate an impact of the intrusion event on hardware components of endpoint device 100A, and/or (iv) perform other actions.

To identify that the intrusion event has occurred, management controller 152 may receive an intrusion alert notification from a tamper detection device of endpoint device 100A via any of side band channels 174. To perform the forensic analysis, management controller 152 may snoop previous and/or ongoing communications between hardware components of hardware resources 150 via side band channels 174. To perform the action set, management controller 152 may provide instructions to hardware resources 150 via side band channels 174, may provide instructions to a startup management entity of endpoint device 100A via side band channels 174, and/or may otherwise remediate an impact of the intrusion event.

Management controller 152 may be operably connected to communication components of endpoint device 100A via separate channels (e.g., 172) from the in band components, and may implement or otherwise utilize a distinct and independent network stack (e.g., TCP/IP). Consequently, management controller 152 may communicate with other devices independently of any of the in band components (e.g., does not rely on any hosted software, hardware components, etc.). Accordingly, compromise of any of hardware resources 150 and hosted components may not result in indirect compromise of management controller 152, and entities hosted by management controller 152.

To facilitate communication with other devices, endpoint device 100A may include network module 160. Network module 160 may provide communication services for in band components and out of band components (e.g., management controller 152) of data processing system. For example, network module 160 may host a TCP/IP stack to facilitate network communications via an out of band communication channel. To do so, network module 160 may include traffic manager 162 and interfaces 164.

Traffic manager 162 may include functionality to (i) discriminate traffic directed to various network endpoints advertised by endpoint device 100A, and (ii) forward the traffic to/from the entities associated with the different network endpoints. For example, to facilitate communications with other devices, network module 160 may advertise different network endpoints (e.g., different media access control address/internet protocol addresses) for the in band components and out of band components. Thus, other entities may address communications to these different network endpoints. When such communications are received by network module 160, traffic manager 162 may discriminate and direct the communications accordingly (e.g., over channel 170 or channel 172, in the example shown in FIG. 1B, it will be appreciated that network module 160 may discriminate traffic directed to any number of data units and direct it accordingly over any number of channels).

Channel 170 may include an in band channel that services hardware resources 150 and channel 172 may include an out of band channel that services out of band components (e.g., management controller 152). Channel 170 and channel 172 may run through network module 160.

Accordingly, traffic directed to management controller 152 may never flow through any of the in band components. Likewise, outbound traffic from the out of band component may never flow through the in band components.

To support inbound and outbound traffic, network module 160 may include any number of interfaces 164. Interfaces 164 may be implemented using any number and type of communication devices which may each provide wired and/or wireless communication functionality. For example, interfaces 164 may include a wireless wide area network (WWAN) card, a WiFi card, a wireless local area network card, a wired local area network card, an optical communication card, and/or other types of communication components. These components may support any number of wired/wireless channels 176.

Network module 160 (e.g., via interfaces 164) may separately advertise network endpoints for management controller 152 and hardware resources 150. Thus, from the perspective of an external device, the in band components and out of band components of endpoint device 100A may appear to be two independent network entities, that may independently addressable, and otherwise unrelated to one another.

To facilitate management of endpoint device 100A over time, hardware resources 150, management controller 152 and/or network module 160 may be positioned in separately controllable power domains. By being positioned in these separately controllable power domains, different subsets of these components may remain powered while other subsets are unpowered.

For example, management controller 152 and network module 160 may remain powered while hardware resources 150 is unpowered. Consequently, management controller 152 may remain able to communicate with other devices even while hardware resources 150 are inactive. Similarly, management controller 152 may perform various actions while hardware resources 150 are not powered and/or are otherwise inoperable, unable to cooperatively perform various process, are compromised, and/or are unavailable for other reasons.

Therefore, if hardware resources 150 become unavailable (e.g., due to being unpowered) then out of band components may remain powered, allowing for forensic analysis of intrusion events and transmission of forensic reports to remote entities while hardware resources 150 are inoperable.

To implement the separate power domains, endpoint device 100A may include a power source (e.g., 180) that separately supplies power to power rails (e.g., 184, 186) that power the respective power domains. Power from the power source (e.g., a power supply, battery, etc.) may be selectively provided to the separate power rails to selectively power the different power domains. A power manager (e.g., 182) may manage power from power source 180 that is supplied to the power rails (e.g., by providing instructions via side band channels 174). Management controller 152 may cooperate with power manager 182 to manage supply of power to these power domains. Management controller 152 may communicate with power manager 182 via side band channels 174 and/or via other means.

In FIG. 1B, an example implementation of separate power domains using power rails 184-186 is shown. The power rails may be implemented using, for example, bus bars or other types of transmission elements capable of distributing electrical power. While not shown, it will be appreciated that the power domains may include various power management components (e.g., fuses, switches, etc.) to facilitate selective distribution of power within the power domains.

When providing its functionality, endpoint device 100A may perform all, or a portion, of the methods and operations illustrated in FIGS. 2A-3.

While illustrated in FIG. 1B with a limited number of specific components, a system may include additional, fewer, and/or different components without departing from embodiments disclosed herein.

As discussed above, the components of FIGS. 1A-1B may perform various methods to manage intrusion events for endpoint devices that perform computer-implemented services. FIGS. 2A-3 may illustrate examples of methods that may be performed by the components of FIGS. 1A-1B. For example, a management controller and/or other component of an endpoint device may perform all or a portion of the methods. In the diagrams discussed below and shown in FIGS. 2A-3, any of the operations may be repeated, performed in different orders, and/or performed in parallel with or in a partially overlapping in time manner with other operations.

To further clarify embodiments disclosed herein, a data flow diagram in accordance with an embodiment is shown in FIG. 2A. In this diagram, flows of data and processing of data are illustrated using different sets of shapes. A first set of shapes (e.g., 200, 204, etc.) is used to represent data structures, a second set of shapes (e.g., 202, 208, etc.) is used to represent processes performed using and/or that generate data, and a third set of shapes (e.g., 210, etc.) is used to represent large scale data structures such as databases.

Turning to FIG. 2A, a data flow diagram in accordance with an embodiment is shown. The data flow diagram may illustrate data used in and data processing performed in managing intrusion events for endpoint devices.

Consider a scenario in which an intrusion event is detected by a tamper detection device of an endpoint device. The tamper detection device may be: (i) an intrusion detector, (ii) a GPIO tamper detector, (iii) a serial communication tamper detector, and/or (iv) another device. The intrusion detector may be any device or software application that monitors physical intrusion (e.g., into a chassis of endpoint device 100A). The GPIO tamper detector may be any hardware and/or firmware component that monitors a portion of communications via a network module of endpoint device 100A. The serial communication tamper device may be any hardware and/or firmware component that monitors a portion of communications via a serial bus of endpoint device 100A. The tamper detection devices may be other types of tamper detection devices that monitor other components and/or communications for endpoint device 100A without departing from embodiments disclosed herein.

The tamper detection device may generate intrusion alert 200 and may provide intrusion alert 200 to an entity responsible for managing the intrusion event.

For example, the tamper detection device may provide intrusion alert 200 to a management controller (e.g., 152) of the endpoint device. Intrusion alert 200 may be a data structure that includes: (i) a notification that an intrusion event has occurred, (ii) a timestamp associated with the identified intrusion event, (iii) information regarding a type and/or source of the intrusion event, and/or (iv) other information. Intrusion alert 200 may be utilized to perform forensic analysis process 202 and/or may be provided to a remote entity (e.g., remote server 102) via an out of band communication channel (e.g., 172).

To manage the intrusion event, forensic analysis process 202 may be performed. During forensic analysis process 202, policy 206 may be obtained (e.g., retrieved) from policy database 210. Policy database 210 may store any number of policies. The policies stored in policy database 210 (e.g., policy 206) may include processes to be performed that are keyed to different types of intrusion events, different compromised components of an endpoint device, and/or other information related to the intrusion events.

Therefore, policy 206 may include instructions keyed to a type of intrusion indicated by intrusion alert 200. For example, intrusion alert 200 may indicate that a chassis of the endpoint device was physically opened for a duration of time. Policy 206 may include instructions for snooping communications between hardware components of the endpoint device (e.g., a processor, a memory module) in order to identify any unexpected communications that may indicate malicious activity during the intrusion event.

During forensic analysis process 202, communications between hardware components of the endpoint device may be snooped. Doing so may include: (i) querying a first hardware component (e.g., a processor) for contents of a communication sent to a second hardware component (e.g., a memory module), (ii) querying the second hardware component for contents of a communication received by the second hardware component from the first hardware component, (iii) comparing a response from the first hardware component to a response from the second hardware component, and/or (iv) other processes. If the response from the first hardware component and the response from the second hardware component match, the intrusion event may not have impacted at least the first hardware component and the second hardware component.

Figure 2B:
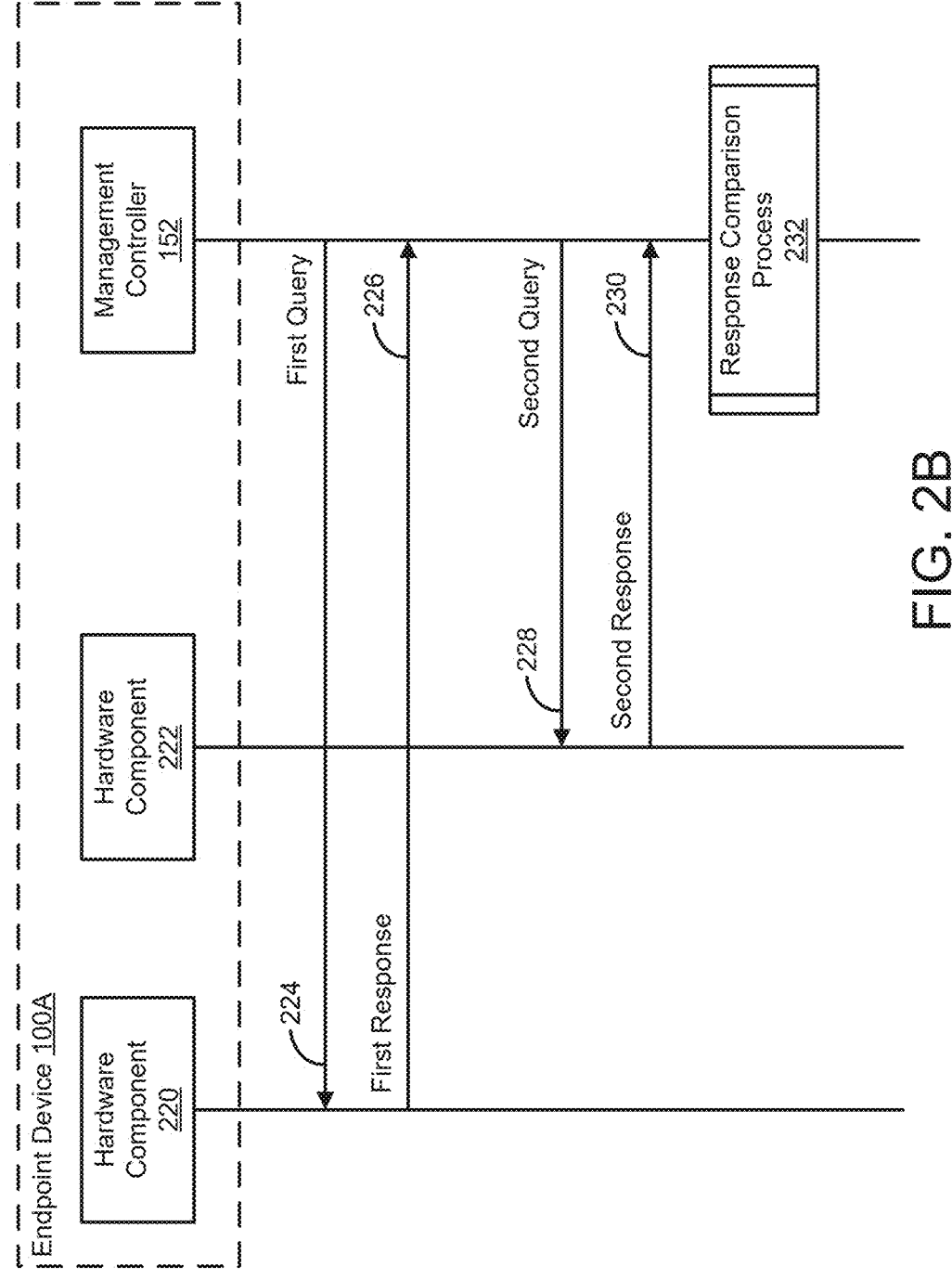
FIG. 2B shows an interaction diagram in accordance with an embodiment.

Performing forensic analysis process 202 may include snooping any number of communications between any number of hardware components of the endpoint device without departing from embodiments disclosed herein. Refer to FIG. 2B for additional details regarding forensic analysis process 202.

As a result of forensic analysis process 202, forensic report 204 may be obtained. Forensic report 204 may indicate an impact of the intrusion event on hardware components of the endpoint device. Specifically, forensic report 204 may include: (i) an identifier for a first hardware component of the hardware components impacted by the intrusion event, (ii) a list of identified modifications made to the first hardware component during the intrusion event, and/or (iii) other information. The list of the identified modifications may be based, at least in part, on the snooped communications.

For example, consider a scenario in which the response from the first hardware component does not match the response from the second hardware component. This may indicate that, during the intrusion event, a malicious entity may have injected a false message alleging as sent by the first hardware component. Forensic report 204 may, therefore, include a copy of the false message, a timestamp associated with the false message, identifiers for an alleged sender (e.g., the first hardware component) and a receiver (e.g., the second hardware component) of the false message, and/or other information.

Forensic report 204 may be stored (e.g., locally, off-site), may be provided to a remote entity (e.g., remote server 102 via an out of band communication channel) and/or may be provided to a startup management entity (e.g., a BIOS) of the endpoint device.

Forensic report 204 may be used to perform action set identification process 208. During action set identification process, information included in forensic report 204 may be extracted and compared to a policy from policy database 210 (e.g., policy 206). Policy 206 may, therefore, also include one or more actions keyed to: (i) types of compromised hardware components, (ii) specific modifications made to the compromised hardware components, and/or (iii) other information included in forensic report 204.

For example, policy 206 may indicate that: (i) the first hardware component is to be disabled, (ii) instructions are to be sent to the second hardware component to disregard communications received from the first hardware component, and/or (iii) instructions are to be provided to a BIOS of the endpoint device to revert to a past startup version of the first hardware component upon a next startup process for the endpoint device. Policy 206 may include other instructions keyed to other portions of forensic report 204 without departing from embodiments disclosed herein.

As a result of action set identification process 208, action set 212 may be obtained. Action set 212 may include a list of actions to be performed in response to the intrusion event. Actions included in action set 212 may include: (i) disabling a hardware component impacted by the intrusion event, (ii) depowering a hardware component impacted by the intrusion event, (iii) reversing identified modifications to a hardware component impacted by the intrusion event, and/or (iv) other actions. Refer to FIG. 3 for additional details regarding performing the action set.

Any of the processes illustrated using the second set of shapes may be performed, in part or whole, by digital processors (e.g., central processors, processor cores, etc.) that execute corresponding instructions (e.g., computer code/software). Execution of the instructions may cause the digital processors to initiate performance of the processes. Any portions of the processes may be performed by the digital processors and/or other devices. For example, executing the instructions may cause the digital processors to perform actions that directly contribute to performance of the processes, and/or indirectly contribute to performance of the processes by causing (e.g., initiating) other hardware components to perform actions that directly contribute to the performance of the processes.

Any of the processes illustrated using the second set of shapes may be performed, in part or whole, by special purpose hardware components such as digital signal processors, application specific integrated circuits, programmable gate arrays, graphics processing units, data processing units, and/or other types of hardware components. These special purpose hardware components may include circuitry and/or semiconductor devices adapted to perform the processes. For example, any of the special purpose hardware components may be implemented using complementary metal-oxide semiconductor based devices (e.g., computer chips).

Any of the data structures illustrated using the first and third set of shapes may be implemented using any type and number of data structures. Additionally, while described as including particular information, it will be appreciated that any of the data structures may include additional, less, and/or different information from that described above. The informational content of any of the data structures may be divided across any number of data structures, may be integrated with other types of information, and/or may be stored in any location.

Thus, using the data flow shown in FIG. 2A, intrusion events may be managed for endpoint devices using out of band methods.

To further clarify embodiments disclosed herein, an interaction diagram in accordance with an embodiment is shown in FIG. 2B. The interaction diagram may illustrate an example of how data may be obtained and used within the systems of FIGS. 1A-1B during forensic analysis process 202 described in FIG. 2A.

In the interaction diagram, processes performed by and interactions between components of a system in accordance with an embodiment are shown. In the diagram, components of the system are illustrated using a first set of shapes (e.g., 220, 152, etc.), located towards the top of each figure. Lines descend from these shapes. Processes performed by the components of the system are illustrated using a second set of shapes (e.g., 232) superimposed over these lines.

Interactions (e.g., communication, data transmissions, etc.) between the components of the system are illustrated using a third set of shapes (e.g., 224, 226, etc.) that extend between the lines. The third set of shapes may include lines terminating in one or two arrows. Lines terminating in a single arrow may indicate that one-way interactions (e.g., data transmission from a first component to a second component) occur, while lines terminating in two arrows may indicate that multi-way interactions (e.g., data transmission between two components) occur.

Generally, the processes and interactions are temporally ordered in an example order, with time increasing from the top to the bottom of each page. For example, the interaction labeled as 224 may occur prior to the interaction labeled as 226. However, it will be appreciated that the processes and interactions may be performed in different orders, any may be omitted, and other processes or interactions may be performed without departing from embodiments disclosed herein.

The processes shown in FIG. 2B may be performed by any entity shown in the systems of FIGS. 1A-1B (e.g., a device similar to one of endpoint devices 100, systems similar to remote server 102, etc.) and/or another entity without departing from embodiments disclosed herein.

Turning to FIG. 2B, an interaction diagram in accordance with an embodiment is shown. The interaction diagram may illustrate processes and interactions that may occur when performing a forensic analysis of an intrusion event for an endpoint device. The interactions and processes shown in FIG. 2B may be an example expansion of forensic analysis process 202 described in FIG. 2A.

To perform forensic analysis process 202, a management controller (e.g., 152) may snoop communications between hardware components of the endpoint device (e.g., hardware component 220 and hardware component 222). Hardware component 220 and hardware component 222 may be similar to any of hardware resources 150 described in FIG. 1B. For example, hardware component 220 and hardware component 222 may include a processor of an endpoint device, a memory module of an endpoint device, etc.

At interaction 224, a first query may be provided to hardware component 220 by management controller 152. For example, the first query may be generated by management controller 152 and may be provided to hardware component 220 through (i) transmission via a message, (ii) storing in a storage with subsequent retrieval by hardware component 220, (iii) a publish-subscribe system where hardware component 220 subscribes to updates from management controller 152 thereby causing a copy of the first query to be propagated to hardware component 220, and/or (iv) other processes.

The first query may include a request for contents of a communication sent by hardware component 220 to hardware component 222. The request may request contents of a specific communication, may request contents of a most recent communication, and/or may request contents of any number of communications sent over a duration of time (e.g., over a duration of time that has passed since the intrusion event). The contents of the communication may include instructions to modify configurations of hardware component 222 and/or other information.

At interaction 226, a first response may be provided to management controller 152 by hardware component 220. For example, the first response may be generated by hardware component 220 and may be provided to management controller 152 through (i) transmission via a message, (ii) storing in a storage with subsequent retrieval by management controller 152, (iii) a publish-subscribe system where management controller 152 subscribes to updates from hardware component 220 thereby causing a copy of the first response to be propagated to management controller 152, and/or (iv) other processes.

The first response may include the contents of the communications requested by the first query. For example, the first response may include contents of a communication provided by hardware component 220 to hardware component 222 after the occurrence of the intrusion event (e.g., instructions).

At interaction 228, a second query may be provided to hardware component 222 by management controller 152. For example, the second query may be generated by management controller 152 and may be provided to hardware component 222 through (i) transmission via a message, (ii) storing in a storage with subsequent retrieval by hardware component 222, (iii) a publish-subscribe system where hardware component 222 subscribes to updates from management controller 152 thereby causing a copy of the second query to be propagated to hardware component 222, and/or (iv) other processes.

The second query may include a request for contents of the communication received by hardware component 222 from hardware component 220. The request may request contents of a specific communication, may request contents of a most recent communication, and/or may request contents of any number of communications sent over a duration of time (e.g., over a duration of time that has passed since the intrusion event). The contents of the communication may include instructions to modify configurations of hardware component 222 and/or other information.

At interaction 230, a second response may be provided to management controller 152 by hardware component 222. For example, the second response may be generated by hardware component 222 and may be provided to management controller 152 through (i) transmission via a message, (ii) storing in a storage with subsequent retrieval by management controller 152, (iii) a publish-subscribe system where management controller 152 subscribes to updates from hardware component 222 thereby causing a copy of the second response to be propagated to management controller 152, and/or (iv) other processes.

The second response may include the contents of the communications requested by the second query. For example, the second response may include contents of a communication provided by hardware component 220 to hardware component 222 after the occurrence of the intrusion event (e.g., instructions).

If hardware component 220 and/or hardware component 222 was compromised during the intrusion event, communications between the hardware components may include false messages. False messages may include communications allegedly generated and transmitted by hardware component 220 that were not generated and transmitted by hardware component 220. Specifically, instructions received by hardware component 222 may include instructions that hardware component 220 did not provide.

To determine whether any false messages were included in the queried communications, management controller 152 may perform response comparison process 232. During response comparison process 232, management controller 152 may compare contents of the first response to contents of the second response. If the contents of the second response include information (e.g., instructions, messages) that are not included in the first response, a false message may have been provided to hardware component 222 during the intrusion event.

Management controller 152 may snoop any number of additional communications between other hardware components during forensic analysis process 202 and/or at other times without departing from embodiments disclosed herein.

Thus, as shown in the example of FIG. 2B, intrusion events may be managed using out of band methods. Out of band components of an endpoint device may snoop communications between hardware components of the endpoint device and may provide information related to the snooped communications to remote entities (e.g., remote server 102) without traversing potentially unavailable and/or compromised in band components of the endpoint device.

By doing so, management controller 152 may identify hardware components impacted by an intrusion event for an endpoint device. In addition, management controller 152 may identify modifications made (and/or attempted to be made) to the impacted hardware components during and/or following the intrusion event. This information (e.g., impacted hardware components, identified modifications) may be compiled into a forensic report which may be provided to remote entities and/or used to remediate the impact of the intrusion event on hardware components of the endpoint device. Doing so may increase a likelihood of the endpoint device providing computer-implemented services as desired by downstream consumers of the computer-implemented services.

Any of the processes illustrated using the second set of shapes and interactions illustrated using the third set of shapes may be performed, in part or whole, by digital processors (e.g., central processors, processor cores, etc.) that execute corresponding instructions (e.g., computer code/software). Execution of the instructions may cause the digital processors to initiate performance of the processes. Any portions of the processes may be performed by the digital processors and/or other devices. For example, executing the instructions may cause the digital processors to perform actions that directly contribute to performance of the processes, and/or indirectly contribute to performance of the processes by causing (e.g., initiating) other hardware components to perform actions that directly contribute to the performance of the processes.

Any of the processes illustrated using the second set of shapes and interactions illustrated using the third set of shapes may be performed, in part or whole, by special purpose hardware components such as digital signal processors, application specific integrated circuits, programmable gate arrays, graphics processing units, data processing units, and/or other types of hardware components. These special purpose hardware components may include circuitry and/or semiconductor devices adapted to perform the processes. For example, any of the special purpose hardware components may be implemented using complementary metal-oxide semiconductor-based devices (e.g., computer chips).

Any of the processes and interactions may be implemented using any type and number of data structures. The data structures may be implemented using, for example, tables, lists, linked lists, unstructured data, data bases, and/or other types of data structures. Additionally, while described as including particular information, it will be appreciated that any of the data structures may include additional, less, and/or different information from that described above. The informational content of any of the data structures may be divided across any number of data structures, may be integrated with other types of information, and/or may be stored in any location.

As discussed above, the components of FIGS. 1A-2B may perform various methods to manage intrusion events for endpoint devices using out of band methods. By doing so, a quality and/or reliability of the computer-implemented services may be increased.

Turning to FIG. 3, a flow diagram illustrating a method of managing intrusion events for endpoint devices in accordance with an embodiment is shown. In the diagram discussed below and shown in FIG. 3, any of the operations may be repeated, performed in different orders, and/or performed in parallel with or in a partially overlapping in time manner with other operations. The method described with respect to FIG. 3 may be performed by an endpoint device, any component of an endpoint device (e.g., a management controller, hardware resources), a remote server, and/or another device.

At operation 300, an identification may be made that an intrusion event has occurred for an endpoint device. Making the identification may include: (i) obtaining an intrusion alert from a tamper detection device of an endpoint device, (ii) reading the intrusion alert from storage, (iii) receiving a notification of the intrusion event from another entity (e.g., a remote entity), and/or (iv) other methods.

Obtaining the intrusion alert from the tamper detection device may include: (i) receiving the intrusion alert via a side band communication channel of the endpoint device, (ii) receiving the intrusion alert via an out of band communication channel of the endpoint device, (iii) receiving a notification from the tamper detection device indicating that the intrusion alert is available in shared storage, and/or (iv) other methods.

At operation 302, a forensic analysis of the intrusion event may be performed to obtain a forensic report. Performing the forensic analysis may include: (i) snooping communications between hardware components of the endpoint device (e.g., via communications sent over side band communication channels of the endpoint device), (ii) compiling information (e.g., compromised hardware components, modifications made to the compromised hardware components) gathered by snooping the communications into the forensic report, and/or (iii) other methods. Refer to FIG. 2B for further details regarding snooping the communications between the hardware components.

At operation 304, an action set may be performed, based on a policy keyed to at least a portion of the forensic report, to remediate an impact of the intrusion event on hardware components of the endpoint device. Performing the action set may include: (i) disabling a first hardware component of the hardware components of the endpoint device, (ii) depowering the first hardware component, (iii) reversing identified modifications made to the first hardware component, and/or (iv) other methods.

Disabling the first hardware component may include providing instructions to the first hardware component and/ or a software agent managing the first hardware component indicating that one or more functionalities of the first hardware component are to be disabled. Disabling the first hardware component may also include providing instructions to a startup management entity of the endpoint device indicating that at one or more functionalities of the first hardware component are to be disabled upon a next startup process for the endpoint device.

Depowering the first hardware component may include: (i) providing instructions to the first hardware component to shut down the first hardware component, (ii) providing instructions to a software entity managing the first hardware component to revoke power from the first hardware component, (iii) providing instructions to a startup management entity indicating that power is not to be provided to the first hardware component upon a next startup process for the endpoint device, and/or (iv) other methods.

Reversing the identified modifications may include: (i) providing instructions to the hardware components indicating modifications to be undone, (ii) providing the forensic report to a startup management entity (e.g., a BIOS) to revert impact of the intrusion event on the hardware components, and/or (iii) other methods.

Providing the forensic report to the startup management entity may include: (i) transmitting, via a side band communication channel, the forensic report to the startup management entity, (ii) storing the forensic report in a storage shared with the startup management entity, (iii) transmitting, via a physical interface, the forensic report to the startup management entity, and/or (iv) other methods. By doing so, the startup management entity may place the endpoint device in a protected startup mode upon the next startup process for the endpoint device, may revert one or more hardware components to a previous version of an operational state (e.g., configurations from before the intrusion event) of the hardware components upon the next startup process, etc.

The method may end following operation 304.

Following obtaining the forensic report, the forensic report may be provided to remote entities. For example, the forensic report may be provided to a remote server by a management controller of the endpoint device via an out of band communication channel. By doing so, the remote entity may manage an impact of the intrusion event, may log the occurrence of the intrusion event in an event log, and/or may otherwise respond to the intrusion event.

As illustrated above, embodiments disclosed herein may provide systems and methods usable to manage intrusion events for endpoint devices. An impact of the intrusion events may be monitored, at least in part, using out of band methods so that an impact of the intrusion event may be remediated and/or reversed. By doing so, computer-implemented services provided by and/or to the endpoint device may be more efficiently managed than when relying on the in band methods.

Figure 4:
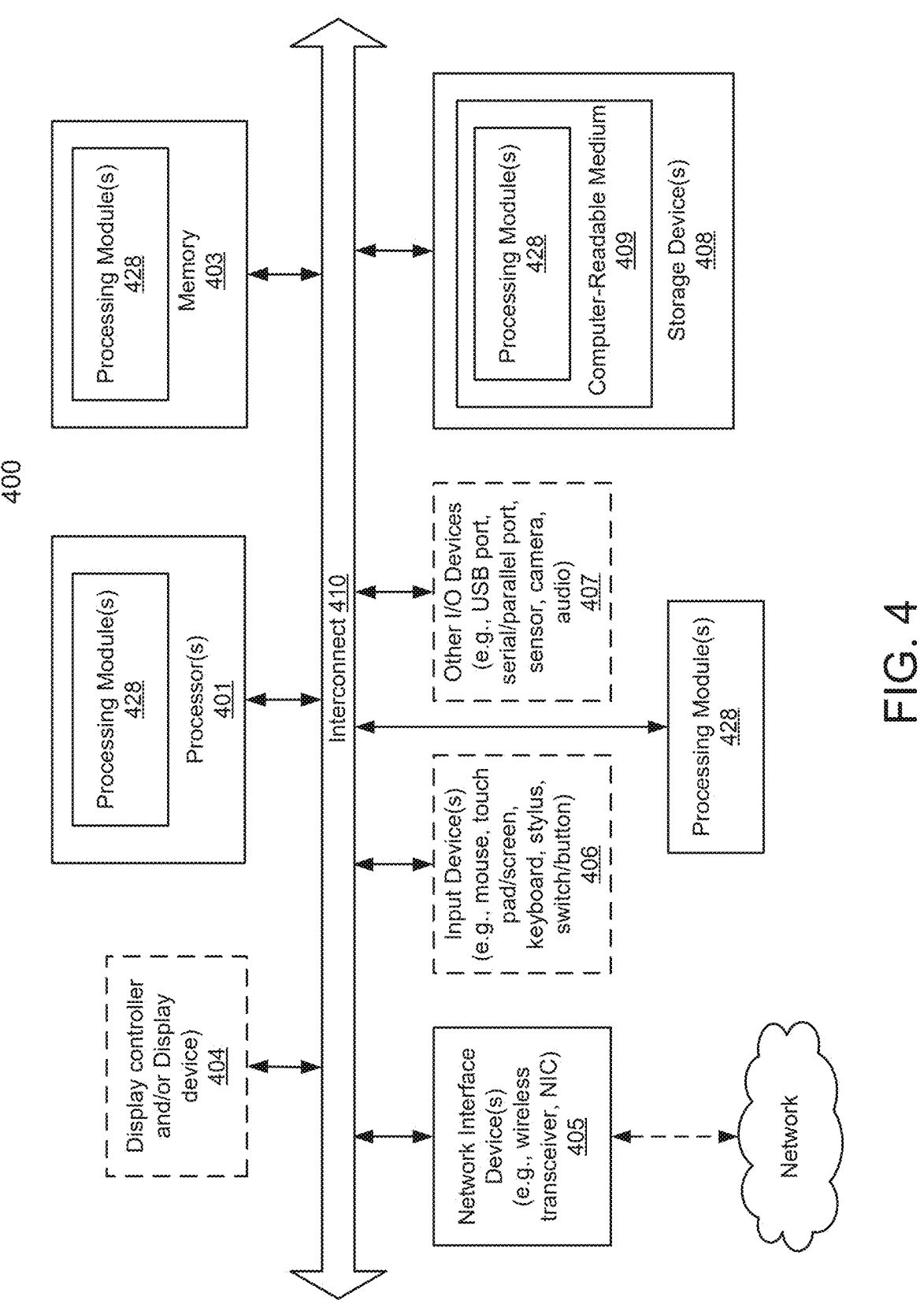
FIG. 4 shows a block diagram illustrating a data processing system in accordance with an embodiment.

Any of the components illustrated in FIGS. 1A-2B may be implemented with one or more computing devices. Turning to FIG. 4, a block diagram illustrating an example of a data processing system (e.g., a computing device) in accordance with an embodiment is shown. For example, system 400 may represent any of data processing systems described above performing any of the processes or methods described above. System 400 can include many different components. These components can be implemented as integrated circuits (ICs), portions thereof, discrete electronic devices, or other modules adapted to a circuit board such as a motherboard or add-in card of the computer system, or as components otherwise incorporated within a chassis of the computer system. Note also that system 400 is intended to show a high-level view of many components of the computer system. However, it is to be understood that additional components may be present in certain implementations and furthermore, different arrangement of the components shown may occur in other implementations. System 400 may represent a desktop, a laptop, a tablet, a server, a mobile phone, a media player, a personal digital assistant (PDA), a personal communicator, a gaming device, a network router or hub, a wireless access point (AP) or repeater, a set-top box, or a combination thereof. Further, while only a single machine or system is illustrated, the term "machine" or "system" shall also be taken to include any collection of machines or systems that individually or jointly execute a set (or multiple sets) of instructions to perform any one or more of the methodologies discussed herein.

In one embodiment, system 400 includes processor 401, memory 403, and devices 405-407 via a bus or an interconnect 410. Processor 401 may represent a single processor or multiple processors with a single processor core or multiple processor cores included therein. Processor 401 may represent one or more general-purpose processors such as a microprocessor, a central processing unit (CPU), or the like. More particularly, processor 401 may be a complex instruction set computing (CISC) microprocessor, reduced instruction set computing (RISC) microprocessor, very long instruction word (VLIW) microprocessor, or processor implementing other instruction sets, or processors implementing a combination of instruction sets. Processor 401 may also be one or more special-purpose processors such as an application specific integrated circuit (ASIC), a cellular or baseband processor, a field programmable gate array (FPGA), a digital signal processor (DSP), a network processor, a graphics processor, a network processor, a communications processor, a cryptographic processor, a co-processor, an embedded processor, or any other type of logic capable of processing instructions.

Processor 401, which may be a low power multi-core processor socket such as an ultra-low voltage processor, may act as a main processing unit and central hub for communication with the various components of the system. Such processor can be implemented as a system on chip (SoC). Processor 401 is configured to execute instructions for performing the operations discussed herein. System 400 may further include a graphics interface that communicates with optional graphics subsystem 404, which may include a display controller, a graphics processor, and/or a display device.

Processor 401 may communicate with memory 403, which in one embodiment can be implemented via multiple memory devices to provide for a given amount of system memory. Memory 403 may include one or more volatile storage (or memory) devices such as random-access memory (RAM), dynamic RAM (DRAM), synchronous DRAM (SDRAM), static RAM (SRAM), or other types of storage devices. Memory 403 may store information including sequences of instructions that are executed by processor 401, or any other device. For example, executable code and/or data of a variety of operating systems, device drivers, firmware (e.g., input output basic system or BIOS), and/or applications can be loaded in memory 403 and executed by processor 401. An operating system can be any kind of operating systems, such as, for example, Windows® operating system from Microsoft®, Mac OS®/iOS® from Apple, Android® from Google®, Linux®, Unix®, or other real-time or embedded operating systems such as Vx Works.

System 400 may further include IO devices such as devices (e.g., 405, 406, 407, 408) including network interface device(s) 405, optional input device(s) 406, and other optional IO device(s) 407. Network interface device(s) 405 may include a wireless transceiver and/or a network interface card (NIC). The wireless transceiver may be a Wi-Fi transceiver, an infrared transceiver, a Bluetooth transceiver, a WiMax transceiver, a wireless cellular telephony transceiver, a satellite transceiver (e.g., a global positioning system (GPS) transceiver), or other radio frequency (RF) transceivers, or a combination thereof. The NIC may be an Ethernet card.

Input device(s) 406 may include a mouse, a touch pad, a touch sensitive screen (which may be integrated with a display device of optional graphics subsystem 404), a pointer device such as a stylus, and/or a keyboard (e.g., physical keyboard or a virtual keyboard displayed as part of a touch sensitive screen). For example, input device(s) 406 may include a touch screen controller coupled to a touch screen. The touch screen and touch screen controller can, for example, detect contact and movement or break thereof using any of a plurality of touch sensitivity technologies, including but not limited to capacitive, resistive, infrared, and surface acoustic wave technologies, as well as other proximity sensor arrays or other elements for determining one or more points of contact with the touch screen.

IO devices 407 may include an audio device. An audio device may include a speaker and/or a microphone to facilitate voice-enabled functions, such as voice recognition, voice replication, digital recording, and/or telephony functions. Other IO devices 407 may further include universal serial bus (USB) port(s), parallel port(s), serial port(s), a printer, a network interface, a bus bridge (e.g., a PCI-PCI bridge), sensor(s) (e.g., a motion sensor such as an accelerometer, gyroscope, a magnetometer, a light sensor, compass, a proximity sensor, etc.), or a combination thereof. IO device(s) 407 may further include an imaging processing subsystem (e.g., a camera), which may include an optical sensor, such as a charged coupled device (CCD) or a complementary metal-oxide semiconductor (CMOS) optical sensor, utilized to facilitate camera functions, such as recording photographs and video clips. Certain sensors may be coupled to interconnect 410 via a sensor hub (not shown), while other devices such as a keyboard or thermal sensor may be controlled by an embedded controller (not shown), dependent upon the specific configuration or design of system 400.

To provide for persistent storage of information such as data, applications, one or more operating systems and so forth, a mass storage (not shown) may also couple to processor 401. In various embodiments, to enable a thinner and lighter system design as well as to improve system responsiveness, this mass storage may be implemented via a solid state device (SSD). However, in other embodiments, the mass storage may primarily be implemented using a hard disk drive (HDD) with a smaller amount of SSD storage to act as an SSD cache to enable non-volatile storage of context state and other such information during power down events so that a fast power up can occur on re-initiation of system activities. Also, a flash device may be coupled to processor 401, e.g., via a serial peripheral interface (SPI). This flash device may provide for non-volatile storage of system software, including a basic input/output software (BIOS) as well as other firmware of the system.

Storage device 408 may include computer-readable storage medium 409 (also known as a machine-readable storage medium or a computer-readable medium) on which is stored one or more sets of instructions or software (e.g., processing module, unit, and/or processing module/unit/logic 428) embodying any one or more of the methodologies or functions described herein. Processing module/unit/logic 428 may represent any of the components described above. Processing module/unit/logic 428 may also reside, completely or at least partially, within memory 403 and/or within processor 401 during execution thereof by system 400, memory 403 and processor 401 also constituting machine-accessible storage media. Processing module/unit/logic 428 may further be transmitted or received over a network via network interface device(s) 405.

Computer-readable storage medium 409 may also be used to store some software functionalities described above persistently. While computer-readable storage medium 409 is shown in an exemplary embodiment to be a single medium, the term "computer-readable storage medium" should be taken to include a single medium or multiple media (e.g., a centralized or distributed database, and/or associated caches and servers) that store the one or more sets of instructions. The terms "computer-readable storage medium" shall also be taken to include any medium that is capable of storing or encoding a set of instructions for execution by the machine and that cause the machine to perform any one or more of the methodologies of embodiments disclosed herein. The term "computer-readable storage medium" shall accordingly be taken to include, but not be limited to, solid-state memories, and optical and magnetic media, or any other non-transitory machine-readable medium.

Processing module/unit/logic 428, components and other features described herein can be implemented as discrete hardware components or integrated in the functionality of hardware components such as ASICS, FPGAs, DSPs, or similar devices. In addition, processing module/unit/logic 428 can be implemented as firmware or functional circuitry within hardware devices. Further, processing module/unit/logic 428 can be implemented in any combination hardware devices and software components.

Note that while system 400 is illustrated with various components of a data processing system, it is not intended to represent any particular architecture or manner of interconnecting the components; as such details are not germane to embodiments disclosed herein. It will also be appreciated that network computers, handheld computers, mobile phones, servers, and/or other data processing systems which have fewer components or perhaps more components may also be used with embodiments disclosed herein.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as those set forth in the claims below, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments disclosed herein also relate to an apparatus for performing the operations herein. Such a computer program is stored in a non-transitory computer readable medium. A non-transitory machine-readable medium includes any mechanism for storing information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices).

The processes or methods depicted in the preceding figures may be performed by processing logic that comprises hardware (e.g. circuitry, dedicated logic, etc.), software (e.g., embodied on a non-transitory computer readable medium), or a combination of both. Although the processes or methods are described above in terms of some sequential operations, it should be appreciated that some of the operations described may be performed in a different order. Moreover, some operations may be performed in parallel rather than sequentially.

Embodiments disclosed herein are not described with reference to any particular programming language. It will be appreciated that a variety of programming languages may be used to implement the teachings of embodiments disclosed herein.

In the foregoing specification, embodiments have been described with reference to specific exemplary embodiments thereof. It will be evident that various modifications may be made thereto without departing from the broader spirit and scope of the embodiments disclosed herein as set forth in the following claims. The specification and drawings are, accordingly, to be regarded in an illustrative sense rather than a restrictive sense.

What is claimed is:

1. A method of managing security for an endpoint device, the method comprising:

making, by a management controller that is physically installed within the endpoint device and that operates as a separate and independent computing device from the endpoint device, an identification that an intrusion event has occurred for the endpoint device;

performing, by the management controller, a forensic analysis of the intrusion event to obtain a forensic report, the forensic report indicating an impact of the intrusion event on hardware components of the endpoint device, and the forensic analysis being performed, at least in part, by snooping communication between the hardware components of the endpoint device, wherein the endpoint device comprises a network module adapted to separately advertise network endpoints for the management controller and hardware resources of the endpoint device, the network endpoints being usable by a remote server to address communications to the hardware resources and the management controller; and performing, by the management controller and based on a policy keyed to at least a portion of the forensic report, an action set to remediate the impact of the intrusion event on the hardware components of the endpoint device.

2. The method of claim 1, wherein making the identification that the intrusion event has occurred comprises obtaining, by the management controller, an intrusion alert from a tamper detection device of the endpoint device.

3. The method of claim 2, wherein the tamper detection device comprises at least one device selected from a list of devices consisting of:

an intrusion detector;

a general-purpose input/output (GPIO) tamper detector; and a serial communication tamper detector.

4. The method of claim 1, wherein the forensic report comprises:

an identifier for a first hardware component of the hardware components impacted by the intrusion event; and a list of identified modifications made to the first hardware component during the intrusion event, the list being based at least in part on the snooped communications.

5. The method of claim 4, wherein performing the action set comprises at least one action selected from a list of actions consisting of:

disabling the first hardware component;

depowering the first hardware component; and reversing the identified modifications.

6. The method of claim 1, further comprising:

providing, by the management controller and via an out of band communication channel, the forensic report to the remote server.

7. The method of claim 1, wherein performing the action set comprises:

providing, by the management controller, the forensic report to a startup management entity of the endpoint device to cause the startup management entity to revert impact of the intrusion event on the hardware components.

8. The method of claim 6, wherein the management controller and the network module are on separate power domains from the hardware resources so that the management controller and the network module are operable while the hardware resources are inoperable.

9. The method of claim 6, wherein the out of band communication channel runs through the network module, and an in band communication channel that services the hardware resources also runs through the network module.

10. The method of claim 6, wherein the network module hosts a transmission control protocol/internet protocol (TCP/IP) stack to facilitate network communications via the out of band communication channel.

11. A non-transitory machine-readable medium having instructions stored therein, which when executed by a processor, cause the processor to perform operations for managing security for an endpoint device, the operations comprising:

making, by a management controller that is physically installed within the endpoint device and that operates as a separate and independent computing device from the endpoint device, an identification that an intrusion event has occurred for the endpoint device;

performing, by the management controller, a forensic analysis of the intrusion event to obtain a forensic report, the forensic report indicating an impact of the intrusion event on hardware components of the endpoint device, and the forensic analysis being performed, at least in part, by snooping communication between the hardware components of the endpoint device, wherein the endpoint device comprises a network module adapted to separately advertise network endpoints for the management controller and hardware resources of the endpoint device, the network endpoints being usable by a remote server to address communications to the hardware resources and the management controller; and performing, by the management controller and based on a policy keyed to at least a portion of the forensic report, an action set to remediate the impact of the intrusion event on the hardware components of the endpoint device.

12. The non-transitory machine-readable medium of claim 11, wherein making the identification that the intrusion event has occurred comprises obtaining, by the management controller, an intrusion alert from a tamper detection device of the endpoint device.

13. The non-transitory machine-readable medium of claim 12, wherein the tamper detection device comprises at least one device selected from a list of devices consisting of:

an intrusion detector;

a general-purpose input/output (GPIO) tamper detector; and a serial communication tamper detector.

14. The non-transitory machine-readable medium of claim 11, wherein the forensic report comprises:

an identifier for a first hardware component of the hardware components impacted by the intrusion event; and a list of identified modifications made to the first hardware component during the intrusion event, the list being based at least in part on the snooped communications.

15. The non-transitory machine-readable medium of claim 14, wherein performing the action set comprises at least one action selected from a list of actions consisting of:

disabling the first hardware component;

depowering the first hardware component; and reversing the identified modifications.

16. A data processing system, comprising:

a processor; and a memory coupled to the processor to store instructions, which when executed by the processor, cause the processor to perform operations for managing security for an endpoint device, the operations comprising:

making, by a management controller that is physically installed within the endpoint device and that operates as a separate and independent computing device from the endpoint device, an identification that an intrusion event has occurred for the endpoint device;

performing, by the management controller, a forensic analysis of the intrusion event to obtain a forensic report, the forensic report indicating an impact of the intrusion event on hardware components of the endpoint device, and the forensic analysis being performed, at least in part, by snooping communication between the hardware components of the endpoint device, wherein the endpoint device comprises a network module adapted to separately advertise network endpoints for the management controller and hardware resources of the endpoint device, the network endpoints being usable by a remote server to address communications to the hardware resources and the management controller; and performing, by the management controller and based on a policy keyed to at least a portion of the forensic report, an action set to remediate the impact of the intrusion event on the hardware components of the endpoint device.

17. The data processing system of claim 16, wherein making the identification that the intrusion event has occurred comprises obtaining, by the management controller, an intrusion alert from a tamper detection device of the endpoint device.

18. The data processing system of claim 17, wherein the tamper detection device comprises at least one device selected from a list of devices consisting of:

an intrusion detector;

a general-purpose input/output (GPIO) tamper detector; and a serial communication tamper detector.

19. The data processing system of claim 16, wherein the forensic report comprises:

an identifier for a first hardware component of the hardware components impacted by the intrusion event; and a list of identified modifications made to the first hardware component during the intrusion event, the list being based at least in part on the snooped communications.

20. The data processing system of claim 19, wherein performing the action set comprises at least one action selected from a list of actions consisting of:

disabling the first hardware component;

depowering the first hardware component; and reversing the identified modifications.

* * * * *